US011885127B2

(12) United States Patent
Kilievoi

(10) Patent No.: US 11,885,127 B2
(45) Date of Patent: Jan. 30, 2024

(54) MOUNTING PROFILE FOR LIGHTING SYSTEM OF SUSPENDED CEILING

(71) Applicant: OSAÜHING VECTA DESIGN, Pärnu (EE)

(72) Inventor: Vitalii Kilievoi, Pärnu (EE)

(73) Assignee: OSAÜHING VECTA DESIGN, Pärnu (EE)

( * ) Notice: Subject to any disclaimer, the term of this patent is extended or adjusted under 35 U.S.C. 154(b) by 76 days.

(21) Appl. No.: 17/772,380

(22) PCT Filed: Nov. 5, 2020

(86) PCT No.: PCT/IB2020/060405
§ 371 (c)(1),
(2) Date: Apr. 27, 2022

(87) PCT Pub. No.: WO2021/090224
PCT Pub. Date: May 14, 2021

(65) Prior Publication Data

US 2022/0381029 A1 Dec. 1, 2022

(30) Foreign Application Priority Data

Nov. 5, 2019 (EE) ................................ P201900026

(51) Int. Cl.
*E04B 9/00* (2006.01)
*F21S 8/02* (2006.01)
*F21V 21/04* (2006.01)

(52) U.S. Cl.
CPC .............. *E04B 9/006* (2013.01); *F21S 8/026* (2013.01); *F21V 21/04* (2013.01)

(58) Field of Classification Search
CPC ........... E04B 9/006; F21S 8/026; F21V 21/04
See application file for complete search history.

(56) References Cited

U.S. PATENT DOCUMENTS 10,487,503 B2 * 11/2019 White ........................ F21S 4/28
2006/0262521 A1 * 11/2006 Piepgras .................... F21S 2/00 362/404
2015/0138779 A1 * 5/2015 Livesay .................. H01L 24/73 362/298
2017/0082266 A1 * 3/2017 Ruhland ................. F21S 8/066

FOREIGN PATENT DOCUMENTS

CN 208457902 U 2/2019
DE 19852702 C1 6/2000
DE 202006003729 U1 * 7/2006 ............. E04B 9/006
EP 3428360 A1 1/2019

OTHER PUBLICATIONS

Machine translation of DE-202006003729-U1 (Year: 2006).*
PCT/IB2020/060405, International Search Report dated Mar. 12, 2021, 3 pages.
PCT/IB2020/060405, Written Opinion of the International Searching Authority dated Mar. 12, 2021, 6 pages.

* cited by examiner

*Primary Examiner* — Leah Simone Macchiarolo
(74) *Attorney, Agent, or Firm* — Meunier Carlin & Curfman LLC

(57) ABSTRACT

A mounting profile for lighting system of suspended ceiling, which comprises a comprehensive triple-section aluminium profile, where repositionable wireless luminaires fitted with magnets can be used on the mounting profile and comprises devices for fastening stretch ceiling material as well as other types of suspended ceiling materials thereto.

11 Claims, 3 Drawing Sheets

MOUNTING PROFILE FOR LIGHTING SYSTEM OF SUSPENDED CEILING

CROSS REFERENCES

This is a U.S. national application of the international application number PCT/IB2020/060405 filed on Nov. 5, 2020 and claiming priority of Estonian patent application P201900026 filed on Nov. 5, 2019, the contents of both of which are incorporated herein by reference.

TECHNICAL FIELD

The invention belongs in the field of construction, more specifically the invention relates to a mounting profile for the lighting system of suspended ceiling, particularly stretch ceiling.

PRIOR ART

Known are lighting profiles used in suspended ceilings, which allow the use of repositionable luminaires.

A lighting system profile for suspended ceiling CN208457902 U (Yang Meng, published Feb. 1, 2019) is a technical solution closest to the invention, it allows using repositionable suspended ceiling luminaires in a suspended ceiling, while the luminaires are changed by removing a luminaire fitted with a magnet from the profile and positioning it back to the profile in a new place. The mounting profile of the lighting system comprises a metal strip for installing a luminaire fitted with a magnet, and a conducting strip, which being connected to the contact terminals on the luminaire supplies the luminaire with wireless power and interrupts the supply when the luminaire is removed from the profile. This mounting profile for a lighting system cannot be used with stretch ceilings.

SUMMARY OF THE INVENTION

The objective of the presented invention is to produce an integrated mounting profile, which is mounted on the base ceiling and connects the suspended ceiling and ceiling lighting system, allowing the use of wireless luminaires fitted with a magnet and repositionable on the mounting profile in the ceiling lighting system.

The mounting profile of the presented lighting system for the suspended ceiling comprises a comprehensive triple-section aluminium profile with a special design, containing an upper section, middle section, and lower section. The middle section in turn comprises an upper, middle, and lower part. The upper section comprises a vertical edge and a horizontal edge which is turned inwards from the top, forming a horizontal fixing groove for the horizontal mounting strip. In the middle section, the upper part has an inner horizontal edge and an outer horizontal edge, which form a chamber with a space for the mounting screws of the fastening device intended for fastening the mounting profile to the base ceiling, while in the middle section the vertical outer sides of the upper part are with relief pattern for better fixing of mounting screws to the sides of the upper part of the middle section of the fastening device. Optionally, a fastening element for the base ceiling may be attached to the fastening device. In the middle part of the middle section, there is a canal for fixing the contact block of the luminaire fitted with a magnet, and in the bottom part a canal for the footing of the luminaire. At the top of the middle part of the middle section, there is a fixing groove for the metal strip.

On the outer sides of the middle section and a lower section, there are vertical fixing grooves for vertical mounting strips. On the inner side of the middle part of the middle section, there are locking grooves, where conducting contract strips have been installed. The contact strips are connected through a wire to a separate mains adapter. The lower section comprises recesses for fixing the stretch ceiling material, and a fastening element with a groove pattern in relief for mounting another supplementary suspended ceiling material. On the outer side of the mounting profile, there are fixing grooves for the connectors of the profile. If necessary, the mounting profile can be fitted with an end cap, the profile has screw grooves and a recess on the inner side for the purpose of fastening it.

The mounting profile is intended for suspended ceiling materials, preferably stretch ceiling materials, but also for other suspended ceiling materials (such as gypsum board, boarding, metal strips, etc.), whereas the stretch ceiling material and other suspended ceiling materials can be used simultaneously or independently as needed.

LIST OF FIGURES

THE EMBODIMENT OF THE INVENTION

Figure 1:
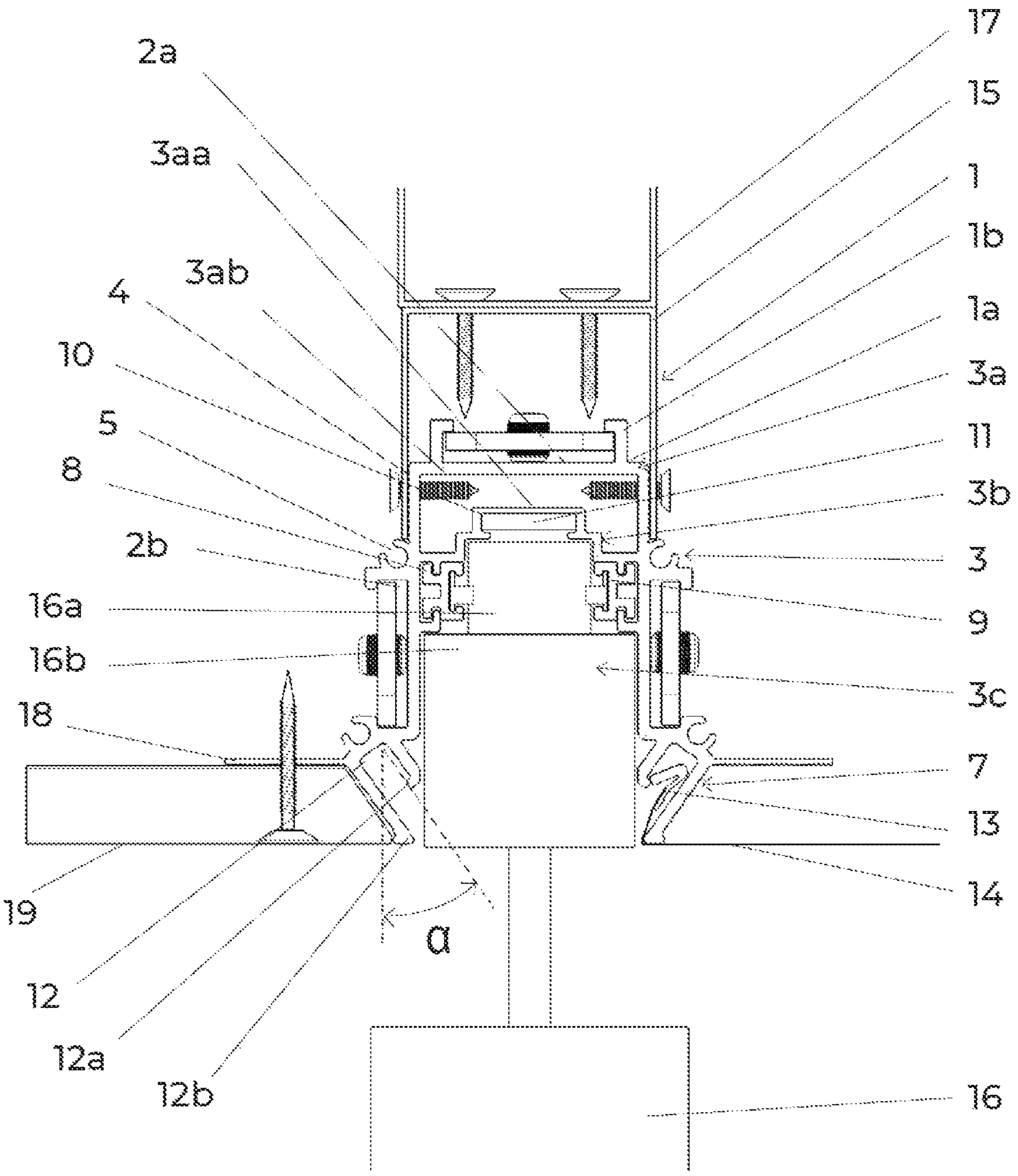
FIG. 1 shows a general view of the mounting profile.

The presented mounting profile for the lighting system of the suspended ceiling is intended primarily for use indoors. Preferably, the mounting profile of a lighting system is primarily intended for the installation of a stretch ceiling, but can also be used with other materials of suspended ceilings (such as gypsum board, boarding, metal strips, etc.).

The mounting profile of the invention comprises a comprehensive special solution of an aluminium profile with three sections, equipped with conductive contact strips and a metal strip, which allow for the use of wireless, repositionable luminaires fitted with a magnet along with the mounting profile to which stretch ceiling material and other suspended ceiling materials can be attached.

The special solution of the mounting profile includes the extension of the known mounting profile for the lighting system of the suspended ceiling with an upper and lower section and upgrading of the middle section. An upgrade of the upper section facilitates the use of fasteners, which allow the construction of longer profile solutions. An upgrade of the lower section comprises additional elements for fixing a stretch ceiling material and any other suspended ceiling materials to the mounting profile, and an upgrade of the upper part of the middle section ensures increased rigidity and durability of the mounting profile.

The mounting profile for the lighting system of suspended ceiling comprises a comprehensive special solution of an aluminium profile with three sections, which comprises an upper section 1, middle section 3, and lower section 7, while the middle section 3 is divided into upper part 3*a*, middle part 3*b* and lower part 3*c*.

The upper section 1 comprises a vertical edge 1*a* and a horizontal edge 1*b* which is turned inwards from the top, forming a horizontal fixing groove 2*a* for the horizontal mounting strip 2*aa*, which is preferably of metal. On the external sides of the middle section 3 and bottom section 7 there are also vertical fixing grooves 2*b* for vertical mounting strips 2*ba*, which are preferably of metal. The horizontal and vertical fixing grooves 2*a*, 2*b* together with the horizontal mounting strips 2*aa* and vertical mounting strips 2*ba* are intended for continuing the mounting profile as needed. Creating a possibility to continue the mounting profile ensures that in case of a mounting profile longer than 2.5 m, several profiles can be mutually connected (extended, continued) precisely and along with one level using durable horizontal and vertical mounting strips 2*aa*, 2*ba*. The fact whether horizontal fixing groove 2*a* and horizontal mounting strip 2*aa* or vertical fixing groove 2*b* and vertical mounting strip 2*ba* or both are used for a specific site (premise) is contingent on whether the intention is to continue the mounting profile in a straight line in the room (horizontal mounting strip 2*aa*) or to create solutions at an angle (vertical mounting strips 2*ba*). If there is only one mounting strip—horizontal mounting strip 2*aa*—on the mounting profile, then over time the mounting profile can subside under the pressure of the ceiling and the stability of the luminaires in the ceiling could be at risk.

To maximize the durability of the mounting profile, its middle section 3 comprises a separate upper part 3*a* with an inner horizontal edge 3*aa* and outer horizontal edge 3*ab*, which support the mounting profile. Between the inner and outer horizontal edges, 3*aa* and 3*ab* remain a chamber, which is intended for the installation of the mounting screws of the fastening device 15 (a U profile) used for fastening the mounting profile to the base ceiling. The mounting profile with such a solution offers extra support against the high pressure from the stretch ceiling to which the mounting profile is exposed and ensures the stability of the mounting profile.

The middle section 3 of the mounting profile comprises a middle part 3*b*, which forms a channel, where the contact block 16*a* fitted with a magnet for luminaire 16 is inserted. On the inner side of the middle part 3*b* there are locking grooves 8, in which contact strips 9 supplied with electricity through a cable from a separate mains adapter and power plug are installed (preferably produced from copper and PVC). These contact strips 9 to be connected with electricity are located along with the entire mounting profile. The purpose of the contact strips 9 is to allow mounting on any part of the mounting profile wireless luminaires 16, where one side of the contact block is fitted with a positive and the other side with a negative terminal (contacts), and to change the location of the luminaire on the mounting profile if needed, ensuring thereby power connection for the luminaire 16 in any part along with the mounting profile.

At the top of the middle part 3*b* of the middle section 3 of the mounting profile, there is a special rectangular fixing groove 10. Inside the fixing groove 10 is a metal strip 11 installed to ensure that the contact block 16*a* of a luminaire 16 with a base of magnetic material is fixed to the mounting profile. The metal strip 11 installed inside the fixing groove 10 helps to ensure a durable technical solution, which will not become deformed and allows fixing and removing various luminaires from the mounting profile sustainably and with ease.

The bottom part 3*c* of the middle section 3 of the mounting profile is a canal with locking grooves 8 at the top and the canal of the middle part 3*b* above it. The footing 16*b* of the luminaire 16 is inserted into the void in the bottom part 3*c*.

Both vertical outer sides 4 of the upper part 3*a* of the middle section 3 of the mounting profile are with groove pattern in relief, which helps in the installation of the mounting profile and mounting to the fastening device 15, because the ribbed part allows precise and stable fixing of the fastening device 15 using screws that can be adjusted one groove at a time. The grooves thereby help to avoid leveling defects in the base ceiling.

Figure 3:
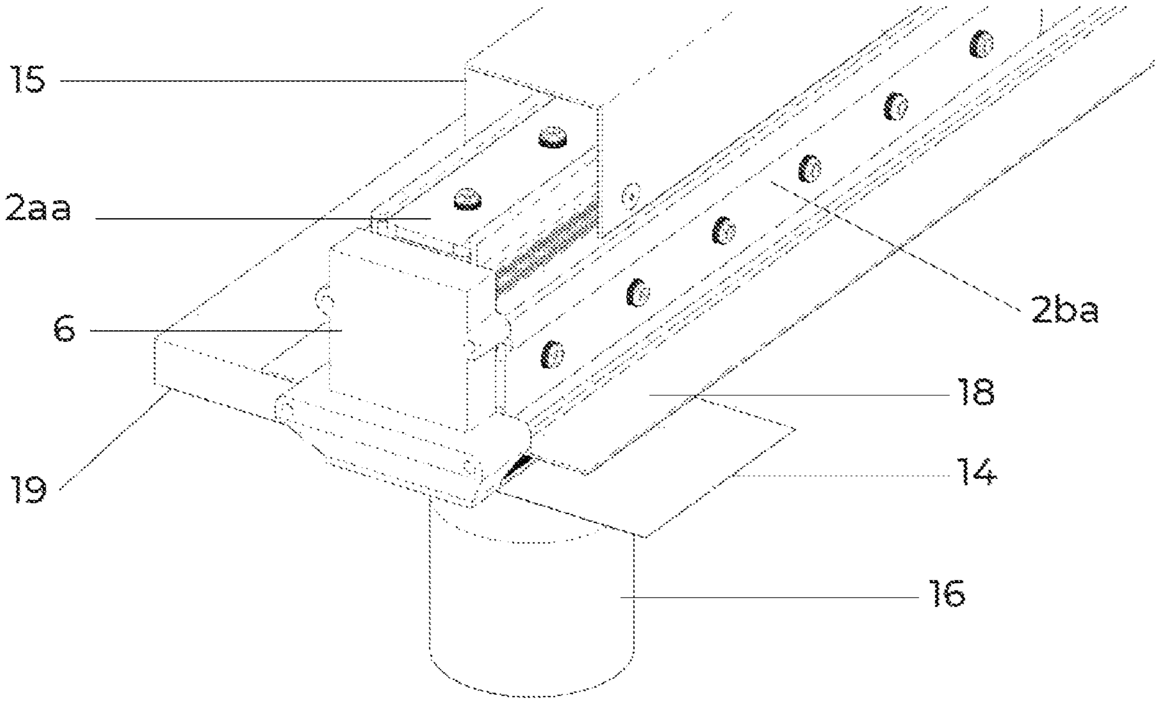
FIG. 3 shows the mounting profile with an end cap.

On the sides of the mounting profile, there are four screw grooves 5 (the highest is approximately in the middle of the middle section 3 of the mounting profile and the lowest approximately in the middle of the bottom section 7 of the mounting profile). Screw grooves 5 are intended for fixing the end cap 6 to the ends of the mounting profile (see FIG. 3). This allows creating mounting profiles with various lengths according to need. On the inner side of the end cap 6 of the mounting profile is a recess for attaching the harpoon 13 of the stretch ceiling material 14.

The bottom part 3*c* of the middle section 3 of the mounting profile becomes the bottom section 7 of the mounting profile. The bottom section 7 comprises on its outer sides a recess 12 for attaching the harpoon 13 of the stretch ceiling material 14 and additionally a horizontal fastening element 18 for another suspended ceiling material 19. The inner side of the top edge of the horizontal fastening element 18 is supplied with a groove pattern in relief to ensure a better grip of the suspended ceiling material 19 to the fastening element 18. Supplementary screws are used for fastening the suspended ceiling material 19 to the horizontal fastening element 18.

In recess 12, at the end of the inner and shorter edge there is a protrusion 12*a* turned inwards, and at the end of the outer and longer edge an edge 12*b* with a round wider area. The recess 12 is at an acute angle $\alpha$ to the side of the mounting profile (preferably in a range from 30 to 40 degrees) pointed towards the inside of the mounting profile and with the installation of the stretch ceiling material 14, the harpoon 13 attached (preferably welded) to the stretch ceiling material 14 is attached to the recess 12. The outer edge of the recess 12 is longer and with a round wider edge 12*b* to ensure a safe installation of the stretch ceiling material 14, because sharp edges can damage the stretch ceiling material. The inner edge of the recess 12 is shorter and with a protrusion 12*a* so that the harpoon end 13 with a respective groove to ensure a better grip of the protrusion 12*a*, could be fastened behind it when mounted in the recess 12.

The position of recess 12 at the angle $\alpha$ to the side of the mounting profile, pointing towards the inside of the mounting profile helps to hide the inside of the mounting profile from below, which otherwise would be visible and as such impact the aesthetic appeal of the suspended ceiling when viewed from the room.

The mounting profile has been designed to be used first and foremost with the stretch ceiling material 14, but it can be used also with other suspended ceiling materials as well. For this purpose, the outer side of lower section 7 of the mounting profile has been supplied with a horizontal fastening element 18 to which other suspended ceiling materials 19 could be fastened (such as gypsum board or boarding or metal strips, etc.) This adds further functionality to the mounting profile, turning it into a multi-purpose product. The invention allows the use of stretch ceiling and suspended ceiling materials together or independently on the mounting profile.

The mounting profile of a lighting system for suspended ceilings is used with wireless luminaires 16 available on the market for the purpose, fitted with a magnet and mains adapter and supplied with power through the terminals of the contact block of the luminaire, which are in contact with the contact strip 9 that is supplied with power via a cable from a mains adapter separate from the mounting profile.

The mounting profile is mounted to the base ceiling, using a fastening device 15. A special fastening element 17 (not part of the invention) for the base ceiling can be attached to it if necessary. If only the fastening device 15 is used, the mounting profile is fastened to the base ceiling through it, such as with screws. If the fastening elements 17 for the base ceiling are used, these are first fastened through their base, e.g. with screws, to the fastening device 15 (see FIG. 1) and then the mounting profile is fastened (e.g. with screws) using the fastening elements 17 of the base ceiling to the base ceiling.

The installation of the mounting profile is started by fastening the fastening device 15 or fastening elements 17 of the base ceiling to the base ceiling in the desired and required positions of the mounting profile. Fastening only using the fastening device 15 is recommended, when it is necessary to install the suspended ceiling and lighting system at a minimum distance from the base ceiling (approx. 7.5 cm). The mounting profile can be fastened to the base ceiling also using supplementary fastening elements 17 (not part of the invention) of the base ceiling, which allow suspending the suspended ceiling even further down from the base ceiling.

Figure 2:
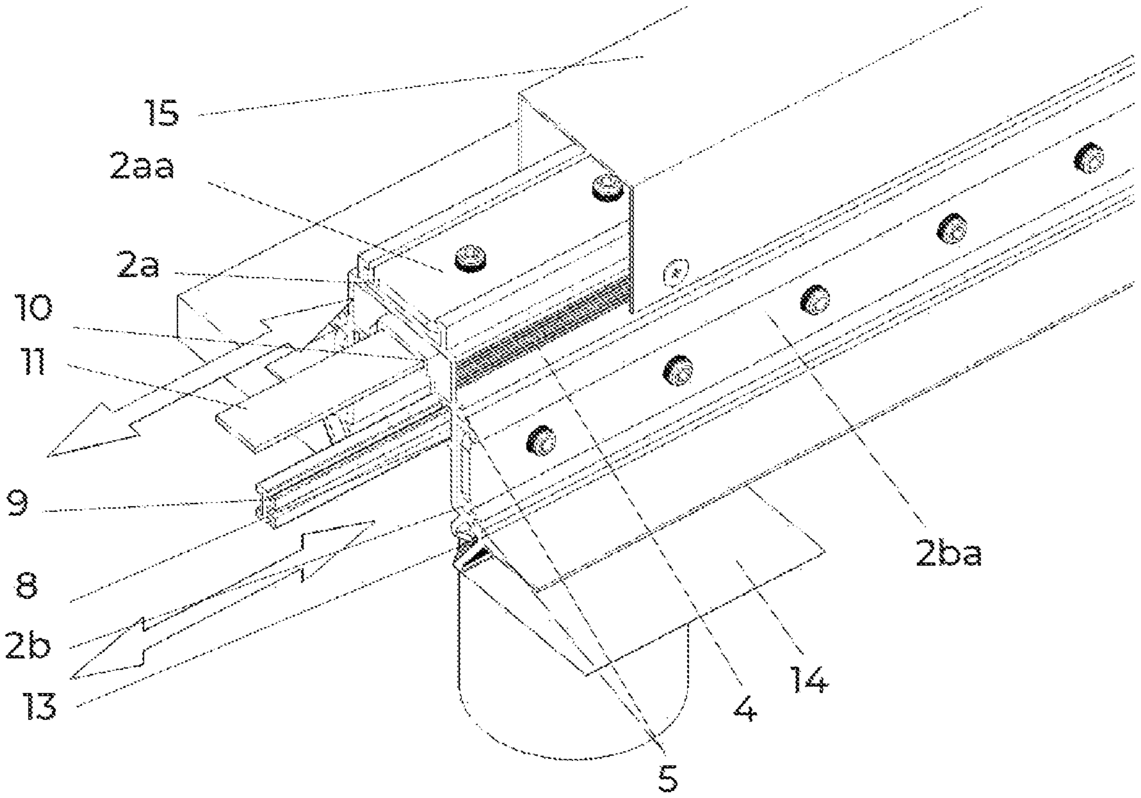
FIG. 2 shows individual elements of the mounting profile.

Then a separate mains adapter is installed behind the suspended ceiling, making an opening with a suitable diameter at the bottom of the mounting profile for installation of its power cable, which can then be guided behind the suspended ceiling to the mains adapter. Required electrical work is conducted. From the ends of the mounting profile, the conductive contact strips 9 are installed into the locking grooves 8, and the metal strip in the fixing groove 10 for holding the magnetic fastening of the mains adapter of the luminaire 16 (see FIG. 2). Then the mounting profile is fixed with screws to the fasteners previously installed to the base ceiling, to the vertical relief pattern (grooves) of the outer side 4 of the middle section 3. When the mounting profile has been installed, the stretch ceiling material 14 is fixed using the harpoon 13 previously attached thereto to the recess 12 in the lower section 7 of the mounting profile and then the system is ready for installing the luminaires 16 fitted with a magnet to the desired positions on the mounting profile. The luminaires 16 can be installed to the mounting profile by applying slight pressure (pressing the mains adapter of the luminaire into the channel in the middle section 3*b* and the luminaire itself into the void in the bottom part 3*c*) and the luminaires can be repositioned with ease elsewhere on the mounting profile.

The mounting profile presented in the invention allows primarily the use of a repositionable lighting system in case of suspended ceiling solutions of stretch ceiling materials. The mounting profile also gives a possibility to use stretch ceiling and other ceiling materials simultaneously or independently, offering a mounting profile for a further possibility to use an integrated, repositionable lighting solution. The mounting profile gives a possibility to change the lighting solution in the room and to avoid major engineering (special) solutions and investments entailed with such change. It allows changing the lighting solution in a room by using a special magnetic fastening and metal strip, making it possible to reposition a luminaire in a suspended ceiling with ease. With the mounting profile, it is possible to combine a large number of luminaires with different visual forms, intensity, diffusion level, color temperature, and other various specifications on the same mounting profile. The economy in the use of space becomes apparent in the minimalist and attractive final result of the suspended ceiling solution, in a ceiling stripped of any additional equipment, making it possible to design the main lighting of the room as well as spotlighting as design elements of the room and to create further lighting effects.

A further flexible feature of the mounting profile solution is that it can be installed in the room sporadically since the mounting profile also functions as a separator. The lighting solutions can thereby be located in different parts of the ceiling and be installed at different angles, contributing to a more diverse supply of lighting in the room.

LIST OF REFERENCES

1 - the upper section of mounting profile
1a - vertical edge of the upper section
1b - horizontal edge of the upper section
2a - horizontal fixing groove for horizontal mounting strip 2aa
2b - vertical fixing groove for vertical mounting strip 2ba
2aa - horizontal mounting strip
2ba - vertical mounting strip
3 - the middle section of mounting profile
3a - upper part of middle section 3
3b - middle part of middle section 3
3c - the lower part of middle section 3
3aa - inner horizontal edge of upper part 3b
3ab - outer horizontal edge of upper part 3b
4 - external, relief pattern part of the vertical side of the upper part 3a of the middle section 3 of the mounting profile
5 - screw grooves (for fastening the end cap 6)
6 - end cap
7 - the lower section of the mounting profile
8 - locking grooves on the inner sides of the middle part 3b of the middle section 3 of the mounting profile, for inserting the contact strip 9
9 - contact strip
10 - fixing groove for metal strip 11
11 - metal strip for the magnet of the contact block of luminaire 16
12 - recess for the harpoon 13 of stretch ceiling material 14
12a - inwards protrusion on the inner and shorter edge of recess 12
12b - edge with a round wide area at the end of the outer and longer edge of recess 12
13 - harpoon of stretch ceiling material 14
14 - stretch ceiling material
15 - fastener
16 - luminaire
16a - contact block of the luminaire
16b - footing of the luminaire
17 - fastening element for base ceiling
18 - the horizontal fastening element of suspended ceiling material 19
19 - suspended ceiling material

The invention claimed is:

1. A mounting profile for a lighting system of suspended ceiling, comprising a lighting system profile which comprises a metal strip for fixing a wireless luminaire fitted with a magnet, and contact strips supplied with electricity for supplying mains adapters with terminals with electricity for wireless luminaires and fastening devices for installing the mounting profile to base ceiling, wherein the mounting profile further comprises an aluminum profile with three sections comprising of an upper section, a middle section and a lower section, wherein the middle section comprises an upper part, a middle part, and a lower part, the upper section comprises a vertical edge, and a horizontal edge which is turned inwards from top, forming a horizontal fixing groove for a horizontal mounting strip;

the upper part of the middle section comprises inner horizontal edge and outer horizontal edge, which form a chamber;

the middle part of the middle section is a channel for a contact block of the luminaire, and the lower part of the middle section a channel for a footing of the luminaire;

on an inner side of the middle part of the middle section there are locking grooves for conductive contact strips connected to a mains adapter;

at top of the middle part of the middle section there is a fixing groove for the metal strip;

on outer sides of the middle section and the lower section there are vertical fixing grooves for a vertical mounting strip;

a fastening device is fixed to the sides of the upper part of the middle section;

on outer sides, the lower section comprises a recess at an acute angle a, which comprises an inner shorter edge, where the end comprises a protrusion pointed inwards and an outer longer edge, where the end comprises a round wider area;

besides, the lower section comprises a horizontal fastening element on the outer sides.

2. The mounting profile for lighting system of suspended ceiling according to claim 1, wherein the fastening device is a U profile.

3. The mounting profile for lighting system of suspended ceilings according to claim 1, wherein the fastening device is supplemented with a fastening element for the base ceiling.

4. The mounting profile for lighting system of suspended ceiling according to claim 1, wherein the side of the upper part of the middle section and the inner side of the fastening element comprises groove pattern in relief.

5. The mounting profile for lighting system of suspended ceiling according to claim 1, wherein the mounting profile is ended with an end cap with a recess on the inner side.

6. The mounting profile for lighting system of suspended ceiling according to claim 1, wherein the recess is adapted for fastening stretch ceiling material, while the protrusion is intended for fastening the end of the harpoon of the stretch ceiling material through a groove contained therein.

7. The mounting profile for lighting system of suspended ceiling according to claim 1, wherein the fastening element is adapted for fastening gypsum board if gypsum board is used for the suspended ceiling material.

8. The mounting profile for lighting system of suspended ceiling according to claim 1, wherein the fastening element is adapted for fastening boarding if boarding is used for the suspended ceiling material.

9. The A mounting profile for lighting system of suspended ceiling according to claim 1, wherein the fastening element is adapted for fastening metal strips if metal strips are used for the suspended ceiling material.

10. The mounting profile for lighting system of suspended ceiling according to claim 1, wherein the stretch ceiling material and suspended ceiling material are used together on the mounting profile.

11. The mounting profile for lighting system of suspended ceiling according to claim 1, wherein the stretch ceiling material and suspended ceiling material are used on the mounting profile independently from one another.

* * * * *